(12) United States Patent
Hammar et al.

(10) Patent No.: US 11,941,909 B2
(45) Date of Patent: Mar. 26, 2024

(54) BIOMETRIC IMAGING DEVICE COMPRISING COLOR FILTERS AND METHOD OF IMAGING USING THE BIOMETRIC IMAGING DEVICE

(71) Applicant: FINGERPRINT CARDS ANACATUM IP AB, Gothenburg (SE)

(72) Inventors: Arvid Hammar, Gothenburg (SE); Hans Martinsson, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/249,263

(22) PCT Filed: Nov. 23, 2021

(86) PCT No.: PCT/SE2021/051164
§ 371 (c)(1),
(2) Date: Apr. 17, 2023

(87) PCT Pub. No.: WO2022/108515
PCT Pub. Date: May 27, 2022

(65) Prior Publication Data
US 2023/0410550 A1 Dec. 21, 2023

(30) Foreign Application Priority Data
Nov. 23, 2020 (SE) .................... 2051364-4

(51) Int. Cl.
*G06V 40/13* (2022.01)
*G02B 5/20* (2006.01)
(Continued)

(52) U.S. Cl.
CPC ......... *G06V 40/1318* (2022.01); *G02B 5/204* (2013.01); *G02B 5/28* (2013.01);
(Continued)

(58) Field of Classification Search
CPC .......... G06V 40/1318; G06V 40/1324; G06V 40/1365; G06V 10/143;
(Continued)

(56) References Cited

U.S. PATENT DOCUMENTS

| | | |
|---|---|---|
| 2010/0066854 A1 | 3/2010 | Mather et al. |
| 2013/0033578 A1 | 2/2013 | Wajs |

(Continued)

FOREIGN PATENT DOCUMENTS

| | | |
|---|---|---|
| EP | 3285116 A1 | 2/2018 |
| WO | 2014104379 A1 | 7/2014 |
| WO | 2020085972 A1 | 4/2020 |

OTHER PUBLICATIONS

International Search Report and Written Opinion for International Application No. PCT/SE2021/051164, dated Jan. 25, 2022.
(Continued)

*Primary Examiner* — Premal R Patel
(74) *Attorney, Agent, or Firm* — Westman, Champlin & Koehler, P.A.

(57) ABSTRACT

A display arrangement comprising an optical biometric imaging device for imaging a biometric object comprising: an image sensor comprising a plurality of photodetector pixels; a lens arrangement comprising at least one lens configured to focus light reflected by a biometric object onto the image sensor; an aperture layer arranged between the object to be imaged and the image sensor, wherein the aperture layer comprises an aperture configured to limit the amount of light reaching the image sensor; and a filter element arranged in the aperture and configured to block light within a first wavelength range, wherein an area of the filter element is smaller than an area of the aperture so that a portion of light within the first wavelength range reaching the aperture layer pass through the aperture.

14 Claims, 4 Drawing Sheets

(51) Int. Cl.
  *G02B 5/28* (2006.01)
  *G06F 3/041* (2006.01)
  *G06V 40/12* (2022.01)

(52) U.S. Cl.
  CPC ........ *G06F 3/0412* (2013.01); *G06V 40/1324* (2022.01); *G06V 40/1365* (2022.01)

(58) Field of Classification Search
  CPC .......... G06V 40/12–1394; G02B 5/204; G02B 5/28; G02B 5/22; G02B 5/005; G06F 3/0412
  See application file for complete search history.

(56) References Cited

U.S. PATENT DOCUMENTS

| | | |
|---|---|---|
| 2016/0092731 A1 | 3/2016 | Dainty et al. |
| 2017/0220844 A1 | 8/2017 | Jones et al. |
| 2017/0235398 A1 | 8/2017 | Choi et al. |
| 2017/0357840 A1* | 12/2017 | Chen ........................ G02B 5/201 |
| 2017/0372114 A1 | 12/2017 | Cho et al. |
| 2018/0012069 A1 | 1/2018 | Chung et al. |
| 2018/0074627 A1* | 3/2018 | Kong ................... G06V 40/1318 |
| 2018/0268232 A1 | 9/2018 | Kim et al. |
| 2019/0073508 A1* | 3/2019 | Ling ................... G06V 40/1329 |
| 2020/0097696 A1* | 3/2020 | Yao .................... G06V 40/1365 |
| 2021/0217358 A1* | 7/2021 | Lee .................... G06V 40/1382 |
| 2021/0326561 A1* | 10/2021 | Qiu .................... G06V 40/1318 |
| 2022/0113831 A1* | 4/2022 | Hsueh ................. G06V 40/1318 |

OTHER PUBLICATIONS

Swedish Search Report dated Aug. 26, 2021, for corresponding Swedish Application No. 2051364-4, 3 pages.

* cited by examiner

BIOMETRIC IMAGING DEVICE COMPRISING COLOR FILTERS AND METHOD OF IMAGING USING THE BIOMETRIC IMAGING DEVICE

CROSS-REFERENCE TO RELATED APPLICATION

This Application is a Section 371 National Stage Application of International Application No. PCT/SE2021/051164, filed Nov. 23, 2021, which claims priority to Swedish Patent Application No. 2051364-4 filed on Nov. 23, 2020, and published as WO 2022/108515 A1 on May 27, 2022, in English, the entire contents of which are hereby incorporated by reference in their entireties.

FIELD OF THE INVENTION

The present invention relates to a display arrangement comprising an optical biometric imaging device. In particular, the invention relates to an a display arrangement comprising an optical biometric imaging device suitable for fingerprint sensing and to a method for controlling the display arrangement.

BACKGROUND OF THE INVENTION

Biometric imaging systems are widely used as means for increasing the convenience and security of personal electronic devices, such as mobile phones etc. Fingerprint sensing systems in particular are now included in a large proportion of all newly released consumer electronic devices, such as mobile phones.

Optical fingerprint sensors have been known for some time and may be a feasible alternative to e.g. capacitive fingerprint sensors in certain applications such as for use as under-display sensors in smartphones, tablet computers, presentation screens, access systems and the like. Optical fingerprint sensors may for example be based on the pinhole imaging principle and/or may employ micro-structures, e.g. collimators or microlenses to collect and steer incoming light towards an image sensor.

As the technological development progresses for e.g. OLED touch panel displays, new display models with increased resolution (i.e. LED pixel density) are constantly introduced to the market.

However, with an increasing pixel density in the display, the light transmittivity is similarly decreasing, meaning that less light reaches an optical biometric sensor located underneath the display panel. Thereby, with increasing resolution of the display, it becomes more difficult to acquire high quality biometric images using an optical sensor located under the display.

Accordingly, it is desirable to find solutions to optical biometric imaging under displays with low light transmission.

SUMMARY

In view of above-mentioned and other drawbacks of the prior art, it is an object of the present invention to provide an improved biometric imaging device suitable for use under a display cover glass in an electronic user device, and a method for biometric imaging using such a device.

According to a first aspect of the invention, there is provided a display arrangement comprising: a display panel having an array of light emitting elements; and an optical biometric imaging device arranged underneath the display panel, the optical biometric imaging device comprising: an image sensor comprising a plurality of photodetector pixels; a lens arrangement comprising at least one lens configured to focus light reflected by a biometric object onto the image sensor; an aperture layer arranged between the object to be imaged and the image sensor, wherein the aperture layer comprises an aperture configured to limit the amount of light reaching the image sensor; and a filter element arranged within the aperture and configured to block light within a first wavelength range, wherein an area of the filter element is smaller than an area of the aperture so that a portion of light within the first wavelength range reaching the aperture layer pass through the aperture; wherein at least a portion of the display corresponding to a location of the biometric imaging is controllable to operate in a first biometric imaging mode to emit light comprising wavelengths within the first wavelength range and in a second biometric imaging mode to emit light comprising wavelengths outside of the first wavelength range.

In the present context, the lens arrangement is configured to receive light having been reflected by a biometric object in the form of a fingertip, to thereby capture a fingerprint image. Accordingly, a light source is available for illuminating the finger to ensure that a sufficient amount of light reaches the image sensor. The light source is in the present application a display panel under which the imaging device is arranged as will be exemplified in the following.

In a camera, the type of aperture described may also be referred to as an aperture stop which is an opening limiting the amount of light which passes through an optical system. In the following, the opening will be referred to as an aperture. The aperture typically has a circular cross section, but differently shaped cross sections are also possible, such as a polygonal aperture.

The present invention is based on the realization that the effective aperture size of an optical biometric imaging device can be controlled by means of an aperture and a wavelength selective filter element, where the filter element only partially blocks the aperture such that the effective aperture size depends on the wavelength of light reaching the aperture layer. If the biometric object is illuminated with light only within the first wavelength range, the reflected light will be blocked by the filter element and the effective aperture size is then equal to the difference in size between the filter element and the aperture. If on the other hand the biometric object is illuminated with light outside of the first wavelength range the reflected light will at least pass though the filter element and the effective aperture size is thereby the size of the aperture. Optical filters as such are well known and may for example be configured to block light of a specific color, such a red, green, blue etc. The filter element may in principle be any of a bandpass, low-pass or high-pass filter, and it would also be possible to combine different types of optical filters to achieve the desired properties of the filter element. The filter element may for example be configured based on properties of a display under which the biometric imaging device is to be arranged.

Based on the described invention, a display arrangement is provided where the effective aperture size of the biometric imaging device can be controlled by controlling the wavelength of light illuminating the biometric object. Accordingly, the aperture size can be controlled in a simple and cost-efficient manner. The aperture size greatly influences imaging properties of an optical system, such as depth of field (DOF) which is a measure of how close or how far away from the imaging device an object can be placed while maintaining a good focus. Having the possibility of varying the DOF in an optical fingerprint sensor can be valuable in difficult cases where the finger is dry or cold and where scattered light from within the finger decreases the contrast in the image. It may further be advantageous to be able to modify other imaging properties by changing the aperture size.

The biometric imaging device may be integrated in or located underneath a display panel so that biometric imaging is made possible at any selected location of the display surface. It would also be possible to arrange a plurality of biometric imaging devices underneath the display panel so as to enable full-screen fingerprint sensing capabilities. The pixels of the display will then act as light sources for the biometric imaging device so that light emitted from the display panel is reflected by a biometric object in contact with an outer surface of the display panel and reflected back towards the image sensor, where an image of the biometric object can be formed.

Moreover, by providing display arrangement comprising a biometric imaging device having a controllable effective aperture size, an imaging device with a fixed configuration can be implemented together with displays having different light transmission properties without having to redesign or modify the sensor. Thereby, there is less need to compromise in terms of performance or of keeping several different designs in stock to accommodate for different display properties.

The lens arrangement preferably comprises at least two coaxially aligned lenses. With more lenses, the optical performance of the lens arrangement can be improved, e.g. in the form of larger field of view, sharper image etc. However, in many applications there is also a space restraint meaning that it is desirable to achieve the best possible performance with a low number of lenses. The aperture layer is preferably located between two of the of lenses in the lens arrangement.

According to one embodiment of the invention the filter element is configured to block light having a wavelength lower than 500 nm. The used filter can be a blue color filter configured to block blue light which has wavelengths approximately between 450 nm and 500 nm. In optical fingerprint sensing applications, it is generally preferable to have a filter blocking all infrared (IR) light and near-infrared (NIR) light to reduce disturbances from ambient light such as sunlight. Thereby, light used for fingerprint imaging is preferably in the blue and green wavelength ranges.

According to one embodiment of the invention, the display is configured to operate in the first biometric imaging mode if a light transmission rate of the display is above a predetermined threshold value. In the first imaging mode, light emitted by the display comprises wavelengths within the first wavelength range and is thereby blocked by the filter. Accordingly, for a relatively higher transmission rate of the display, more light reaches the imaging device, and the effective aperture size can be smaller. Light emitted by the display in the first imaging mode may be only within the first wavelength range, or a majority of the emitted light may be in the first wavelength range.

According to one embodiment of the invention display is configured to operate in the second biometric imaging mode if a light transmission rate of the display is below a predetermined threshold value. In the second imaging mode, light emitted by the display comprises wavelengths outside of the first wavelength range thereby pass through the filter. Accordingly, for a relatively lower transmission rate of the display, less light reaches the imaging device, and the effective aperture size is made larger. Light emitted by the display in the second imaging mode may be only outside of the first wavelength range, or a majority of the emitted light may be outside of the first wavelength range.

How to set the threshold value for the transmission rate of the display (rate is measured in % of light transmission) depends on a range of implementation-specific parameters such as the sensitivity of the image sensor, the light emission properties of the display etc., and is preferably determined individually for each implementation.

According to one embodiment of the invention, the lens arrangement comprises three lenses, with a first lens being configured to be located closest to the biometric object, and wherein the aperture layer is located between the first lens and a second lens. The aperture layer is preferably located on an upper surface of the second lens.

According to one embodiment of the invention, the filter element is an annular filter element arranged in the aperture. By means of the annular filter element, two different effective aperture sizes can be provided in a straightforward manner in an optical system without moving parts where one of the effective aperture sizes is defined by the size of the aperture and where the other is defined by the size of the opening of the annulus-shaped filter element. Moreover, by using an annulus-shaped, i.e. a ring-shaped, filter element, arranged in a circular opening, two effective apertures having a circular cross section are provided which is advantageous with regard to the optical properties.

According to one embodiment of the invention, the annular filter element has an outer dimeter which is the same as an inner diameter of the aperture stop, meaning that there is no gap between the annular filter element and the aperture.

According to one embodiment of the invention, an inner radius $r_0$ of the annular filter element is approximately half of an inner radius $r_1$ of the aperture stop, $r_0 \approx r_1/2$. With the aforementioned difference in radius, the two effective aperture sizes are configured to accommodate both so called "high transmittance displays" (HTD) and "low transmittance displays" (LTD) where the difference in transmittance may be as high as a factor four. It should be noted that the described configuration is an example and that other proportions between the two radii are possible if it is desirable to accommodate display types with other relations between the optical transmission properties.

According to one embodiment of the invention, the filter element is a circular filter element arranged in the aperture. In the described embodiment, one of the effective apertures would in effect be annulus-shaped where light in the first wavelength range is blocked by the circular filter element, and the other effective aperture size would be that of the aperture as described above. For an annular aperture, it is possible to achieve a higher contrast for higher spatial frequencies, albeit with the trade-off that the resolution is decreased for lower spatial frequencies.

According to one embodiment of the invention, the circular filter element has a radius which is approximately half of a radius of the aperture, thereby accommodating the aforementioned difference in the amount of light reaching the aperture layer.

According to one embodiment of the invention, a first portion of the filter element is configured to block light within the first wavelength range and a second portion of the filter element is configured to block light within a second wavelength range different form the first wavelength range. By means of a filter element comprising different zones configured to block different wavelength ranges, additional effective aperture sizes could be achieved, i.e. more than two. The filter element could for example comprise different rings configured to block light within different wavelength ranges, thereby providing even greater flexibility to adapt the optical properties of the biometric imaging device for a particular application such as for particular display types with different transmittivity.

According to a second aspect of the invention, there is provided a method of biometric imaging in a display arrangement comprising a display panel with an array of light emitting elements and an optical biometric imaging device, the optical biometric imaging device comprising: an image sensor comprising a plurality of photodetector pixels; a lens arrangement comprising at least one lens configured to focus light reflected by a biometric object onto the image sensor; an aperture layer arranged between an object to be imaged and the image sensor, wherein the aperture layer comprises an aperture configured to limit the amount of light reaching the image sensor; a filter element arranged in the aperture and configured to block light within a first wavelength range, wherein an area of the filter element is smaller than an area of the aperture so that a portion of light within the first wavelength range reaching the aperture layer pass through the aperture, wherein the method comprises controlling least a portion of the display corresponding to a location of the biometric imaging to operate in a first biometric imaging mode to emit light comprising wavelengths within the first wavelength range or in a second biometric imaging mode to emit light comprising wavelengths outside of the first wavelength range; and by the image sensor, capturing an image of a biometric object illuminated with light emitted by the display.

Effects and features of this second aspect of the present invention are largely analogous to those described above in connection with the first aspect of the invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the display arrangement comprising an optical biometric imaging device according to the present invention are mainly described with reference to a fingerprint imaging sensor located under a display panel of a consumer device such as a smartphone, tablet computer and the like. However, other implementations of the imaging device are also possible.

Figure 1:
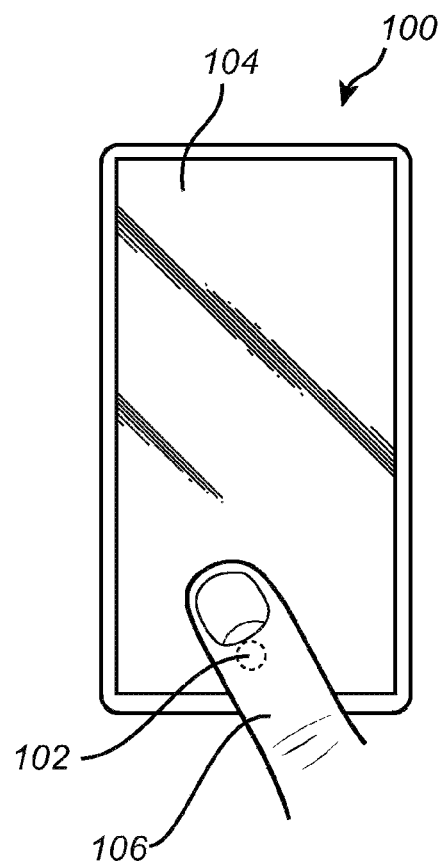
FIG. 1 schematically illustrates display arrangement comprising a biometric imaging device according to an embodiment of the invention.

FIG. 1 schematically illustrates a smartphone 100 comprising an optical biometric imaging device 102 located under a display panel 104 of the smartphone 100. In particular, the biometric imaging device 102 is located under an active display area of the display panel 104. The biometric imaging device 102 is arranged to capture an image of a finger 106 placed on the display panel. In the following description, a device comprising one biometric imaging device 102 will be described. However, it would equally well be possible to arrange a plurality of imaging devices under the display panel so as to enable fingerprint imaging over a larger area portion of the display panel. Moreover, the biometric imaging device 102 may also capture palmprints.

Figure 2:
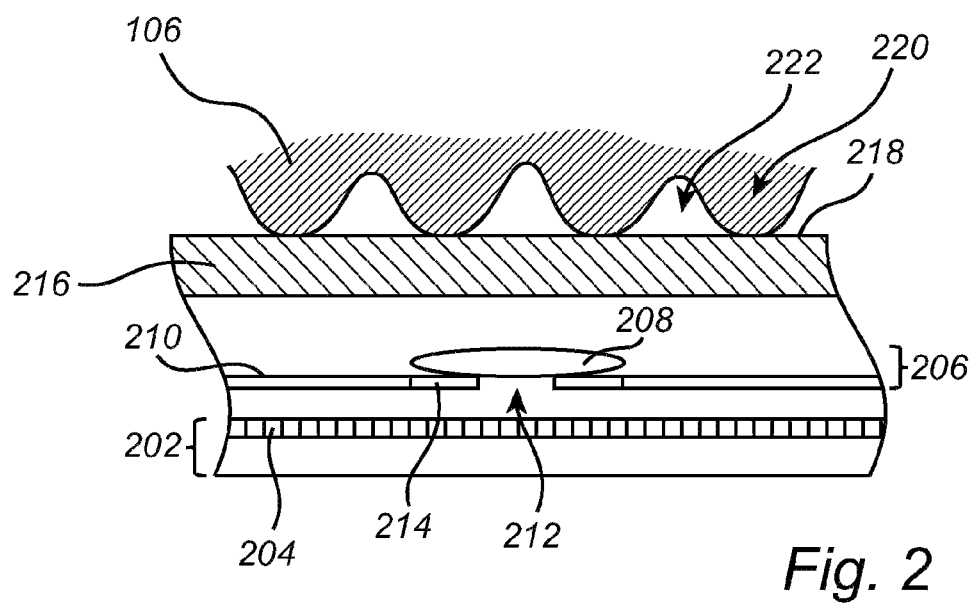
FIG. 2 schematically illustrates an embodiment of a biometric imaging device according to an embodiment of the invention.

FIG. 2 schematically illustrates a portion of an optical biometric imaging device 102. In particular, FIG. 2 illustrates a cross section of a portion of the biometric imaging device 102. The optical biometric imaging device 102 comprises an image sensor 202 comprising a plurality of photodetector pixels 204. It should be noted that the illustrated components are not drawn to scale, and that the illustrations serve to schematically illustrate the features of the claimed invention.

The imaging device 102 further comprises a lens arrangement 206 comprising at least one lens 208 configured to focus light reflected by a biometric object 106 onto the image sensor, an aperture layer 210 arranged between the object to be imaged, here a finger 106 placed on an exterior surface of a display panel 216, and the image sensor 202. In the application where the biometric imaging device is located under a display panel 216, the aperture layer 210 is located between the display panel 216 and the image sensor 202. The finger 106 where fingerprint ridges 220 and valleys 222 can be seen is in contact with an outer surface 218 of the display panel 216. The outer surface 218 of the display panel 216 typically consists of a cover glass. The finger 106 is mainly illuminated by light emitted by the display panel 216, which in turn means that the wavelengths of light reaching the imaging device 102 can be controlled by controlling the wavelengths of light emitted by the display panel, at least in the region nearest the imaging device 102.

Accordingly, the display 216 is controllable to operate in a first biometric imaging mode where the display 216 emits light comprising wavelengths within the first wavelength range and to operate in a second biometric imaging mode where the display 216 is controllable to emit light comprising wavelengths outside of the first wavelength range. The display is preferably controllable to emit light only at the location of the fingerprint sensor. Moreover, the display is controllable to select the wavelength distribution of emitted light in order to suit the properties of the filter.

The aperture layer 210 further comprises an aperture 212 configured to limit the amount of light reaching the image sensor 202. The aperture 212 is thus an opening of an aperture layer 210, where the aperture layer 210 aside from the opening 212 can be considered to be opaque. A filter element 214 is arranged in the aperture 212 and configured to block light within the first wavelength range, wherein an area of the filter element 214 is smaller than an area of the aperture 212 so that a portion of light within the first wavelength range reaching the aperture layer 210 pass through the aperture 212 and further onto the image sensor 202. In the illustrated embodiment, the filter element 214 is located in the same layer as the aperture 212.

Preferably, the filter element 214 is located in the same plane as the aperture layer 210. However, it would also be possible to arrange the filter element 214 above or below the aperture layer 210 in a separate layer, even though the optical properties of the lens arrangement 206 may change.

The described optical biometric imaging device 102 may also comprise additional layers known in the art, such as an IR-cut layer configured to block light within the infrared wavelength range, polarization layers for antireflection treatment etc. However, such additional layers will not be described in detail herein.

Figure 3:
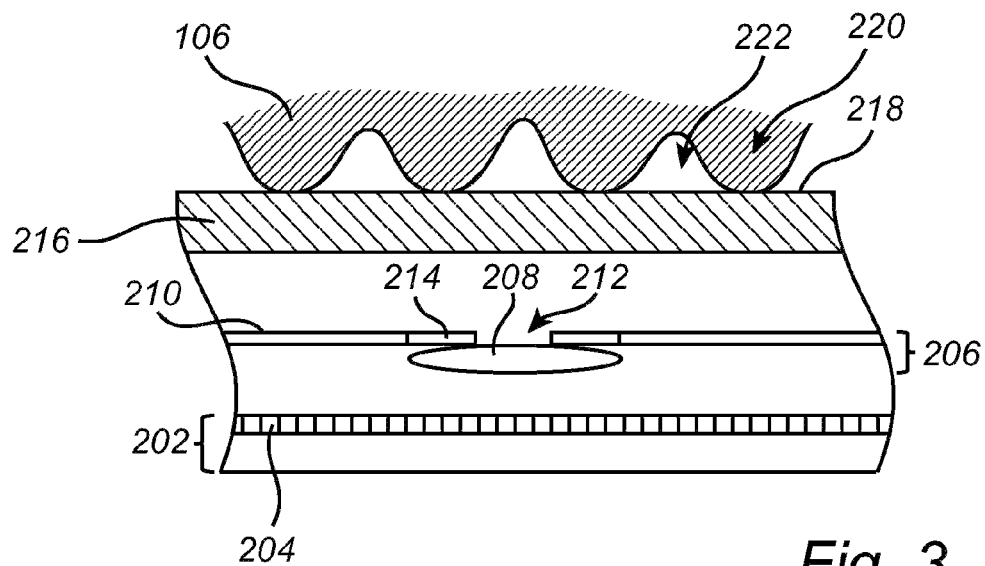
FIG. 3 schematically illustrates an embodiment of a biometric imaging device according to embodiments of the invention.

In FIG. 2, the aperture layer 210 is arranged below the lens 208, i.e. between the lens 208 and the image sensor 202 while in FIG. 3 the aperture layer 210 is arranged above the lens 208, i.e. between the lens 208 and the display panel 216. The specific arrangement of lenses and the location of the aperture layer may be selected based on requirements of the biometric imaging device 102 for a certain application or based on manufacturing aspects and the like.

Figure 4:
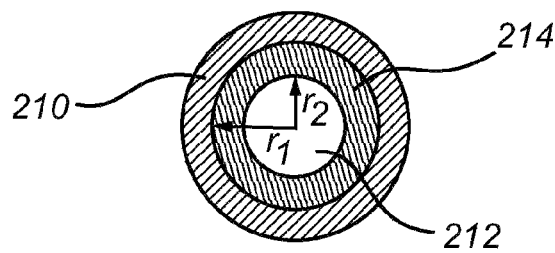
FIG. 4 schematically illustrates a filter element of a biometric imaging device according to embodiments of the invention.

FIG. 4 is an illustration of a portion of the aperture layer 210 comprising a circular aperture 212 having a radius $r_1$ with an annulus-shaped filter element 214 located in the aperture 212, where the opening of the filter element 214 has a radius $r_0$. In the illustrated example, $r_0$ is approximately equal to $r_1/2$. The radius $r_1$ may for example be 0.5 mm in an example implementation. Thereby, for a high transmission display, a smaller effective aperture size can be used and for a low transmission display, the larger effective aperture size is used to allow more light to reach the image sensor 202. It should be noted that this is an example embodiment and that the skilled person readily realizes that the sizes of the aperture 212 and filter element 214 and may be changed to be adapted to specific display types and/or different light transmission conditions of a display panel.

Furthermore, the filter element 214 is configured to block light within a first predefined wavelength range so that if only light within the first wavelength range reaches the aperture layer 210, the effective size of the aperture will be defined by the size of the opening in the filter element 214 and if the light reaching the aperture layer 210 comprises wavelengths outside of the first wavelength range the effective size of the opening will be defined by the full size of the aperture 212. The effective aperture size, and thereby optical properties such as the depth of field, will thus be dependent on the wavelength of light reaching the aperture layer 210. It is thereby possible to modify the optical properties of the biometric imaging device 102 by controlling the wavelengths of light reaching the aperture layer 210.

Figure 5:
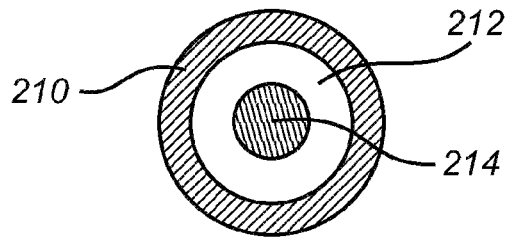
FIG. 5 schematically illustrates a filter element of a biometric imaging device according to embodiments of the invention.

FIG. 5 schematically illustrates the aperture layer 210 for an embodiment of the biometric imaging device where the aperture layer 210 comprises an aperture 212 and a circular filter 502 element arranged centrally in the aperture 212. Similar to the embodiment described above, the effective aperture size can be controlled by controlling the wavelength of light reaching the aperture layer 210. Various shapes and configurations of the filter element 214 are possible, and the filter element is preferably configured so that when the filter element 214 is blocking the received light, the remaining portion of the aperture allowing light to pass through can be described as a single continuous opening which is preferably symmetric, e.g. in the form of a circle or an annulus as illustrated in FIGS. 4-5.

Figure 6:
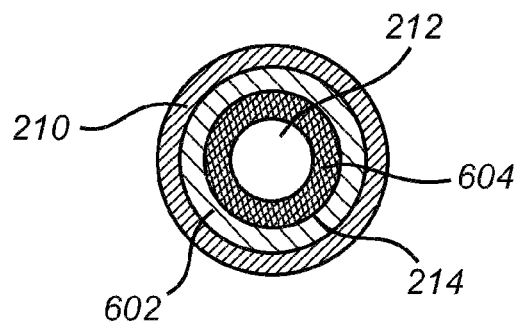
FIG. 6 schematically illustrates a filter element of a biometric imaging device according to embodiments of the invention.

FIG. 6 schematically illustrates an aperture layer 210 where a first portion 602 of the filter element 214 is configured to block light within the first wavelength range and a second portion 604 of the filter element 214 is configured to block light within a second wavelength range different form the first wavelength range. The different portions are here embodiment by two annulus-shaped portions 602, 604. Moreover, the different portions of the filter element may also be seen and provided as separate filter elements.

By configuring the filter portions of the filter element 602, 604 so that the first and second wavelength ranges are non-overlapping, it is possible to form an aperture layer 210 having three different effective aperture sizes based on the wavelengths of light reaching the aperture layer. The first wavelength range may for example correspond to blue light and the second wavelength range may correspond to green light. Based on the above example embodiments, further modifications of the shape and transmission properties of the filter element can be envisaged.

Figure 7:
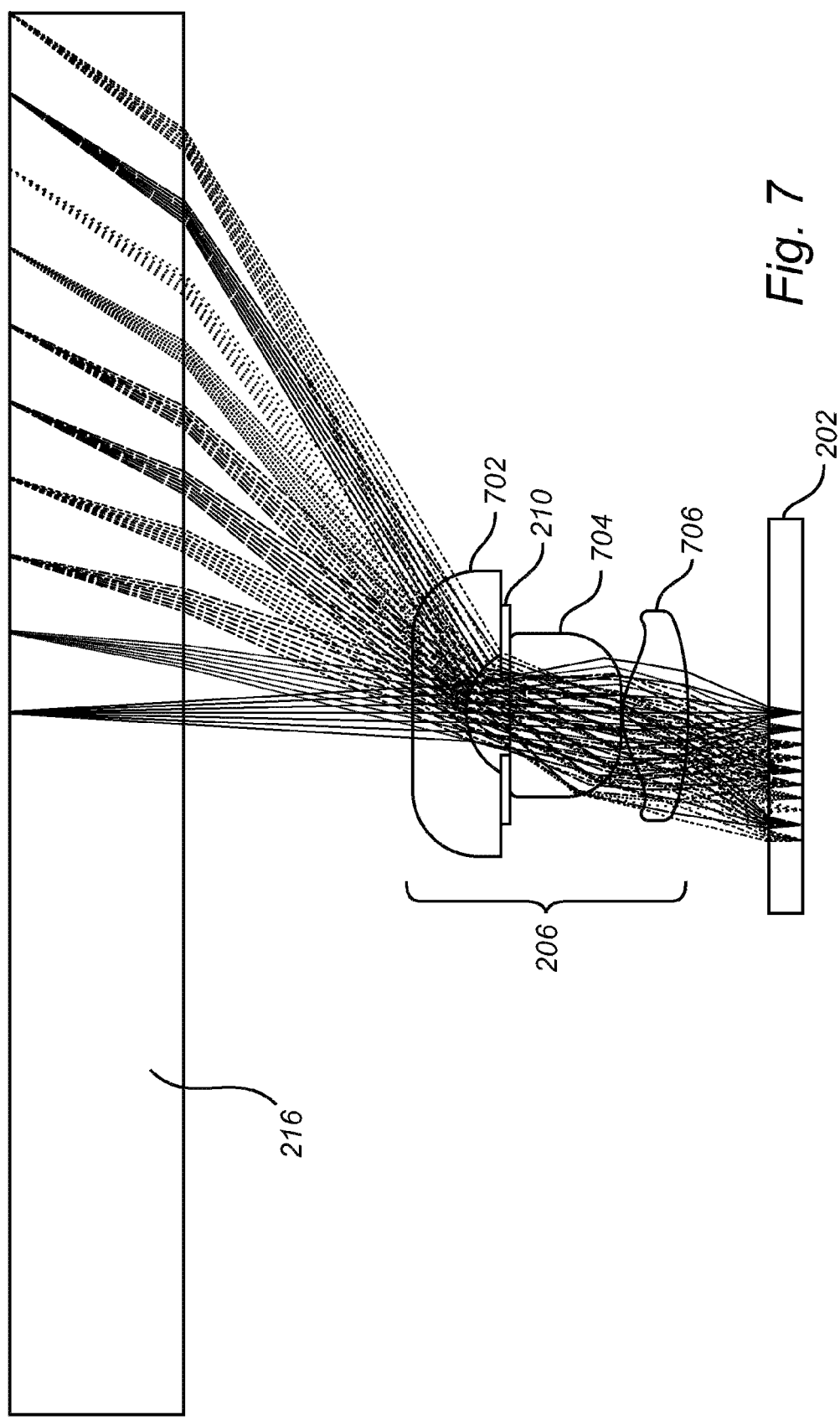
FIG. 7 schematically illustrates an embodiment of a biometric imaging device according to embodiments of the invention.

FIG. 7 schematically illustrates an example embodiment where the lens arrangement comprises three lenses, 702, 704, 708, and where the aperture layer 210 is arranged between the first and second lenses 702, 704 as seen from the direction of the display panel 216. In the illustrated embodiment, the lenses are vertically aligned and axially symmetric lenses. Moreover, the lenses may have free-form surfaces to obtain the desired optical properties.

Figure 8:
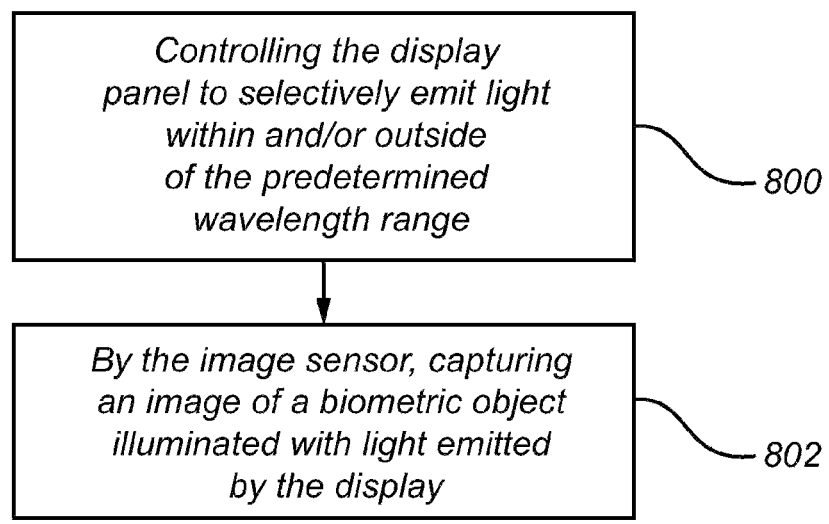
FIG. 8 is a flow chart outlining general details of a method according to an embodiment of the invention.

FIG. 8 is a flow chart outlining general details of a method according to an embodiment of the invention. The method is implemented in a display arrangement comprising a biometric imaging device 102 according to any of the aforementioned embodiments, and the method comprises controlling 800 the display panel 116 to selectively emit light within and/or outside of the predetermined wavelength range depending on the selected biometric imaging mode; and by the image sensor 202, capturing 802 an image of a biometric object illuminated with light emitted by the display. The display panel 116 can thus be controlled to emit light with a suitable wavelength spectrum in the respective first and second biometric imaging mode so that a desired effective aperture size can be achieved by means of the described filter element 214.

Based on the teachings herein, more complex solutions of optical systems including additional filters configured to block light in different wavelength ranges can be derived, thereby enabling systems with a plurality of different effective aperture sizes. However, the general concept of the invention has been described with reference to an optical system comprising one filter element.

Even though the invention has been described with reference to specific exemplifying embodiments thereof, many different alterations, modifications and the like will become apparent for those skilled in the art. Also, it should be noted that parts of the device may be omitted, interchanged or arranged in various ways, the device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A display arrangement comprising:
a display panel having an array of light emitting elements; and
an optical biometric imaging device arranged underneath the display panel, the optical biometric imaging device comprising:
an image sensor comprising a plurality of photodetector pixels;
a lens arrangement comprising at least one lens configured to focus light reflected by a biometric object onto the image sensor;
an aperture layer arranged between the object to be imaged and the image sensor, wherein the aperture layer comprises an aperture configured to limit the amount of light reaching the image sensor; and
a filter element arranged within the aperture and configured to block light within a first wavelength range, wherein an area of the filter element is smaller than an area of the aperture so that a portion of light within the first wavelength range reaching the aperture layer pass through the aperture;
wherein at least a portion of the display corresponding to a location of the biometric imaging is controllable to operate in a first biometric imaging mode to emit light comprising wavelengths within the first wavelength range and in a second biometric imaging mode to emit light comprising wavelengths outside of the first wavelength range.

2. The display arrangement according to claim 1, wherein the filter element is configured to block light having a wavelength lower than 500 nm.

3. The display arrangement according to claim 1, wherein the display is configured to operate in the first biometric imaging mode if a light transmission rate of the display is above a predetermined threshold value.

4. The display arrangement according to claim 1, wherein the display is configured to operate in the second biometric imaging mode if a light transmission rate of the display is below a predetermined threshold value.

5. The display arrangement according to claim 1, wherein the lens arrangement comprises three lenses, with a first lens being configured to be located closest to the biometric object, and wherein the aperture layer is located between the first lens and a second lens.

6. The display arrangement according to claim 1, wherein the filter element is an annular filter element arranged in the aperture.

7. The display arrangement according to claim 6, wherein the annular filter element has an outer dimeter which is the same as an inner diameter of the aperture.

8. The display arrangement according to claim 6, wherein an inner radius $r_0$ of the annular filter element is approximately half of an inner radius $r_1$ of the aperture, $r_0 \approx r_1/2$.

9. The display arrangement according to claim 1, wherein the filter element is a circular filter element arranged in the aperture.

10. The display arrangement according to claim 9, wherein the circular filter element has a radius which is approximately half of a radius of the aperture.

11. The display arrangement according to claim 1, wherein a first portion of the filter element is configured to block light within the first wavelength range and a second portion of the filter element is configured to block light within a second wavelength range different form the first wavelength range.

12. Method of biometric imaging in a display arrangement comprising a display panel with an array of light emitting elements and an optical biometric imaging device, the optical biometric imaging device comprising: an image sensor comprising a plurality of photodetector pixels; a lens arrangement comprising at least one lens configured to focus light reflected by a biometric object onto the image sensor; an aperture layer arranged between an object to be imaged and the image sensor, wherein the aperture layer comprises an aperture configured to limit the amount of light reaching the image sensor; a filter element arranged in the aperture and configured to block light within a first wavelength range, wherein an area of the filter element is smaller than an area of the aperture so that a portion of light within the first wavelength range reaching the aperture layer pass through the aperture, wherein the method comprises:
controlling least a portion of the display corresponding to a location of the biometric imaging to operate in a first biometric imaging mode to emit light comprising wavelengths within the first wavelength range or in a second biometric imaging mode to emit light comprising wavelengths outside of the first wavelength range; and
by the image sensor, capturing an image of a biometric object illuminated with light emitted by the display.

13. The method according to claim 12, further comprising operating the display in the first biometric imaging mode if a light transmission rate of the display is above a predetermined threshold value.

14. The method according to claim 12, further comprising operating the display in the second biometric imaging mode if a light transmission rate of the display is below a predetermined threshold value.

* * * * *